United States Patent
Patil et al.

(10) Patent No.: US 11,525,894 B2
(45) Date of Patent: Dec. 13, 2022

(54) VEHICLE SENSOR ASSEMBLY

(71) Applicant: Ford Global Technologies, LLC, Dearborn, MI (US)

(72) Inventors: Sunil Reddy Patil, Troy, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 746 days.

(21) Appl. No.: 16/521,961

(22) Filed: Jul. 25, 2019

(65) Prior Publication Data

US 2021/0025983 A1 Jan. 28, 2021

(51) Int. Cl.
| | |
|---|---|
| *B60S 1/56* | (2006.01) |
| *G01S 7/481* | (2006.01) |
| *B60S 1/08* | (2006.01) |
| *B08B 5/02* | (2006.01) |
| *G01S 7/497* | (2006.01) |

(52) U.S. Cl.
CPC .............. *G01S 7/4813* (2013.01); *B08B 5/02* (2013.01); *B60S 1/0848* (2013.01); *B60S 1/56* (2013.01); *G01S 2007/4977* (2013.01)

(58) Field of Classification Search
None
See application file for complete search history.

(56) References Cited

U.S. PATENT DOCUMENTS

| | | |
|---|---|---|
| 6,547,305 B1 | 4/2003 | Ellis |
| 6,547,306 B2 | 4/2003 | Espinose et al. |
| 6,793,416 B2 | 9/2004 | Peterson et al. |
| 6,926,346 B1 | 8/2005 | Wong et al. |
| 7,344,183 B2 | 3/2008 | Brash |
| 8,139,109 B2 | 3/2012 | Schmiedel et al. |
| 8,898,852 B2 | 12/2014 | Manninen et al. |
| 9,126,546 B2 | 9/2015 | Bochenek |
| 10,011,251 B2 | 7/2018 | Gokan et al. |
| 10,189,429 B2 | 1/2019 | Krishnan et al. |
| 10,189,450 B2 | 1/2019 | Rice |
| 2015/0040953 A1 | 2/2015 | Kikuta et al. |
| 2018/0015908 A1* | 1/2018 | Rice ......................... B60S 1/56 |
| 2018/0134258 A1 | 5/2018 | Ekola et al. |
| 2018/0143298 A1* | 5/2018 | Newman ............ G01C 21/3484 |
| 2019/0241158 A1* | 8/2019 | Ghannam ............ G05D 1/0238 |
| 2020/0386860 A1* | 12/2020 | Chung .................. G01S 7/4813 |
| 2020/0387174 A1* | 12/2020 | Diehl ..................... G08G 1/167 |

OTHER PUBLICATIONS

U.S. Appl. No. 62/857,784 by inventor Ji Yoon Chung, filed Jun. 5, 2019.*

* cited by examiner

*Primary Examiner* — Mikhail Kornakov
*Assistant Examiner* — Ryan L Coleman
(74) *Attorney, Agent, or Firm* — Frank A. MacKenzie; Bejin Bieneman PLC

(57) ABSTRACT

An assembly includes a housing defining a chamber and having an air inlet. The assembly includes a blower in the chamber and in fluid communication with the air inlet. The assembly includes a sensor defining a field of view and supported by the housing. The housing has an outlet vent of variable size. The outlet vent is in communication with the blower and aimed across the field of view of the sensor.

19 Claims, 4 Drawing Sheets

VEHICLE SENSOR ASSEMBLY

BACKGROUND

A vehicle may operate in an autonomous mode, a semiautonomous mode, or a nonautonomous mode. In the autonomous mode each of a propulsion system, a braking system, and a steering system of the vehicle are controlled by a computer of the vehicle. In a semiautonomous mode the computer controls one or two of the propulsion, braking, and steering systems. In a nonautonomous mode, a human operator controls the propulsion, braking, and steering systems. The computer may control the propulsion, braking, and/or steering systems based on data from one or more sensors.

The sensors detect the external world and generate data, e.g., transmittable via a communication bus or the like to the computer. The sensors may be, for example, radar sensors, scanning laser range finders, light detection and ranging (LIDAR) devices, and image processing sensors such as cameras.

DETAILED DESCRIPTION

Figure 1:
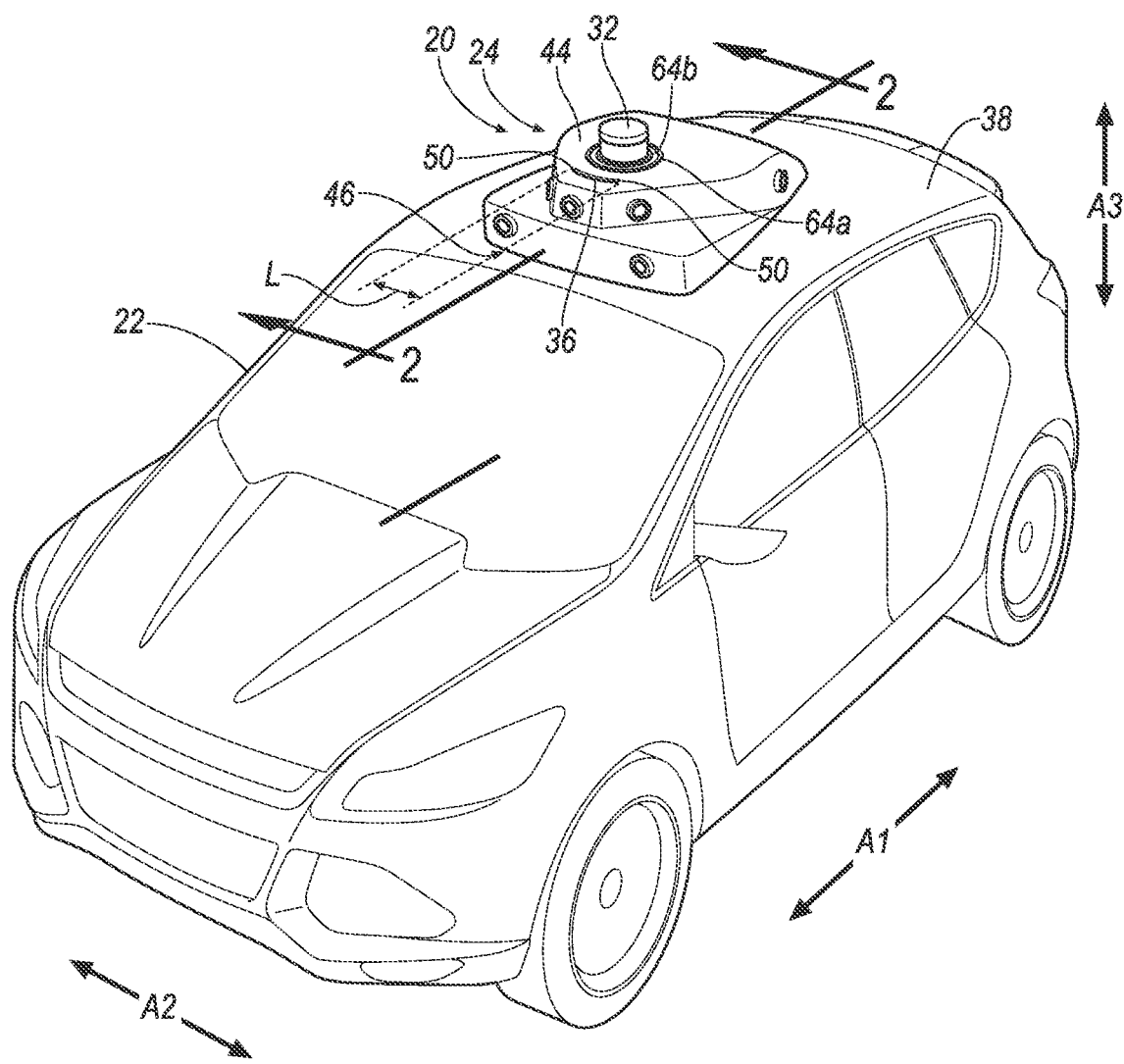
FIG. 1 is a perspective view of a vehicle having an assembly for collecting data to operate the vehicle.

An assembly includes a housing defining a chamber and having an air inlet. The assembly includes a blower in the chamber and in fluid communication with the air inlet. The assembly includes a sensor defining a field of view and supported by the housing. The housing has an outlet vent of variable size, the outlet vent in communication with the blower and aimed across the field of view of the sensor.

The outlet vent may include a plate movable between a first position and a second position, the outlet vent having a larger size when the plate is in first position than in the second position.

The outlet vent may be pivotable relative to the housing.

The housing may have a second outlet vent aimed to direct air across the field of view of the sensor between the sensor and the air from the outlet vent.

The outlet vent may partially encircle the sensor and the second outlet vent may encircle the field of view of the sensor.

The housing has a second outlet vent between the sensor and the outlet vent.

The assembly may include a lens in the field of view of the sensor, the housing having a second outlet vent aimed to direct air across the lens.

The outlet vent may be arcuate.

The outlet vent may have a fixed length and a variable width.

The sensor may be a LIDAR sensor and extend from the housing.

A vehicle includes a roof. The vehicle includes a housing supported by the roof, the housing defining a chamber and having an air inlet. The vehicle includes a blower in the chamber and in fluid communication with the air inlet. The vehicle includes a sensor supported by the housing and defining a field of view. The housing has an outlet vent of variable size, the outlet vent in communication with the blower and aimed across the field of view of the sensor.

The outlet vent may be forward of the sensor.

The vehicle may include a lens in the field of view of the sensor, the housing having a second outlet vent aimed to direct air across the lens.

The outlet vent may be aimed to direct air upward.

The sensor may be a LIDAR sensor and extend upward from the housing.

The outlet vent may include a plate movable between a first position and a second position, the outlet vent having a larger size when the plate is in first position than in the second position.

The plate may be moveable along a vehicle-longitudinal axis.

The outlet vent may have a fixed length along a cross-vehicle axis and a variable width along a vehicle-longitudinal axis.

The outlet vent may be pivotable about a cross-vehicle axis.

With reference to the Figures, wherein like numerals indicate like parts throughout the several views, an assembly 20 for collecting data to operate a vehicle 22 includes a housing 24 defining a chamber 26 and having an air inlet 28. The assembly 20 includes a blower 30 in the chamber 26 and in fluid communication with the air inlet 28. The assembly 20 includes a sensor 32 defining a field of view 34 and supported by the housing 24. The housing 24 has an outlet vent 36 of variable size, the outlet vent 36 in communication with the blower 30 and aimed across the field of view 34 of the sensor 32.

The vehicle 22 may be any type of passenger or commercial vehicle such as a car, a truck, a sport utility vehicle, a crossover vehicle, a van, a minivan, a taxi, a bus, etc. The vehicle 22 may include a passenger cabin to house occupants, if any, of the vehicle 22. The vehicle 22 may include a roof 38, e.g., above the passenger cabin.

The vehicle 22 defines a longitudinal axis A1, e.g., extending between a front and a rear of the vehicle 22. The vehicle 22 defines a cross-vehicle axis A2, e.g., extending between a right side and a left side of the vehicle 22. The vehicle 22 defines a vertical axis A3, e.g., extending between a top and a bottom of the vehicle 22. The longitudinal axis A1, the cross-vehicle axis A2, and the vertical axis A3 are perpendicular to each other.

The vehicle 22 may operate in an autonomous mode, a semiautonomous mode, or a nonautonomous mode. For purposes of this disclosure, an autonomous mode is defined as one in which each of a propulsion system, a braking system, and a steering system of the vehicle 22 are controlled by a computer 40 of the vehicle 22. In a semiautonomous mode the computer 40 controls one or two of the propulsion, braking, and steering systems. In a nonautonomous mode, a human operator controls the propulsion, braking, and steering systems. The computer 40 may control the propulsion, braking, and/or steering systems based on data from one or more sensors 32.

The sensors 32 detect the external world and generate data, e.g., transmittable via a communication bus or the like to the computer 40. The sensors 32 may be, for example, radar sensors, scanning laser range finders, light detection and ranging (LIDAR) devices, and image processing sensors such as cameras. The field of view 34 of each sensor 32 is a volume relative to, and detectable by, such sensor 32. The volume may be defined by azimuth and altitude angle ranges (also referred to as horizontal FOV and vertical FOV), as well as by a depth or detection distance. One or more sensors 32 may be supported by the vehicle 22, the housing 24 of the assembly 20, or other suitable structure.

For example, the sensor 32 may be a LIDAR sensor extending upward and away from the housing 24. The field of view 34 defined by the LIDAR sensor 32 may be 360 degrees horizontal FOV and 30 degrees vertical FOV.

The assembly 20 and/or the sensor 32 may include a lens 42. The lens 42 may protect components of the sensors 32, e.g., prevent debris (such as water or dirt) from contacting a detector chip (such as a CMOS, CCD, InGaAs, or other conventional chip) of the sensor 32. The lens 42 may be transparent or semitransparent glass, plastic, or other suitable material. The lens 42 is in the field of view 34 of the sensor 32. In other words, light may have to pass through the lens 42 before being detected by the sensor 32.

The housing 24 supports and protects other components of the assembly 20, e.g., the blower 30, the sensor 32, etc. The housing 24 may include an outer shell 44, a base, etc. The housing 24 may be carbon fiber, plastic, or any other suitable material. The housing 24 may be supported by the roof 38. For example, the housing 24 may be fixed to the roof 38 with fasteners or other suitable structure.

Figure 2:
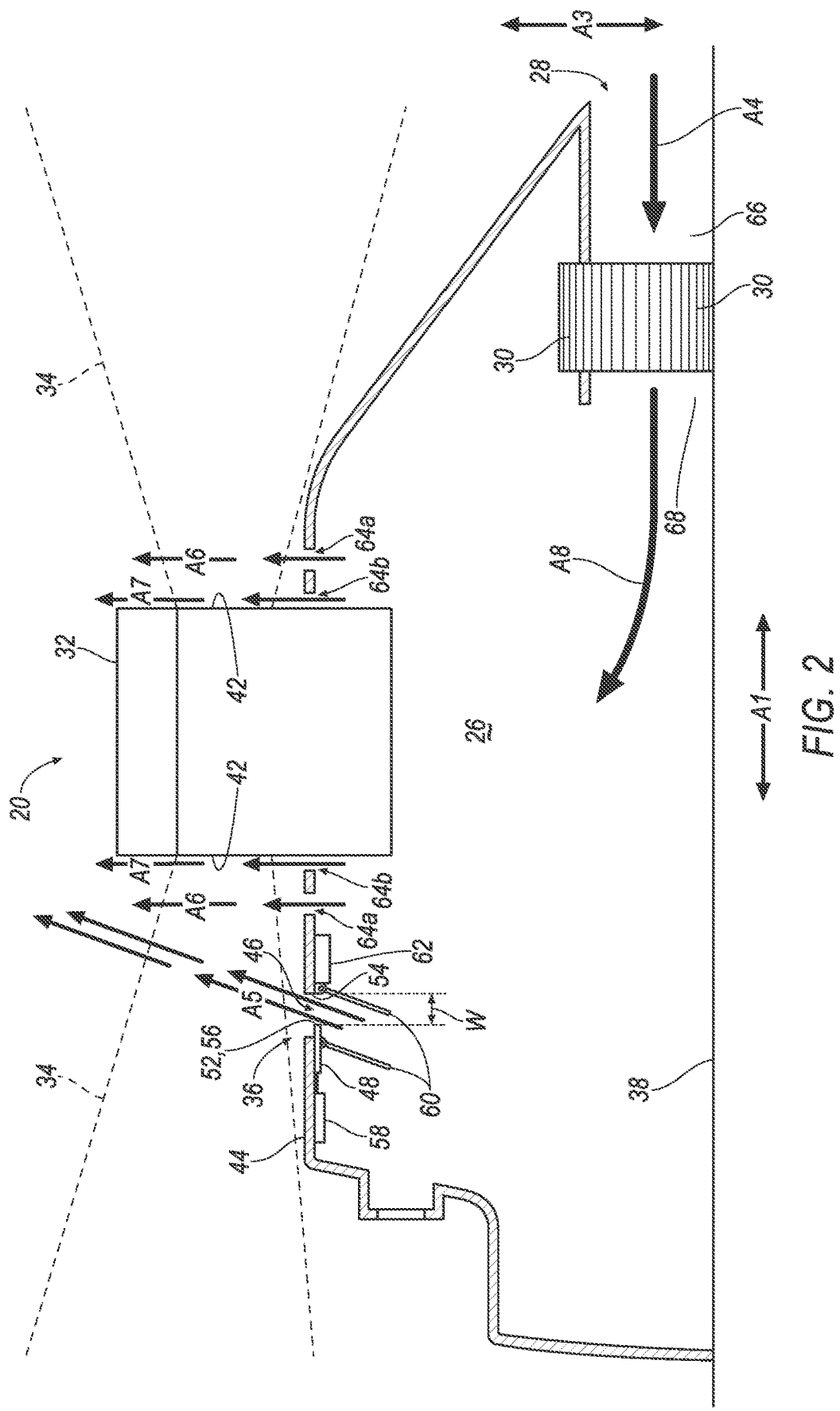
FIG. 2 is a cross section of components of the vehicle and the assembly taken at the line 2-2 of FIG. 1.
Figure 3:
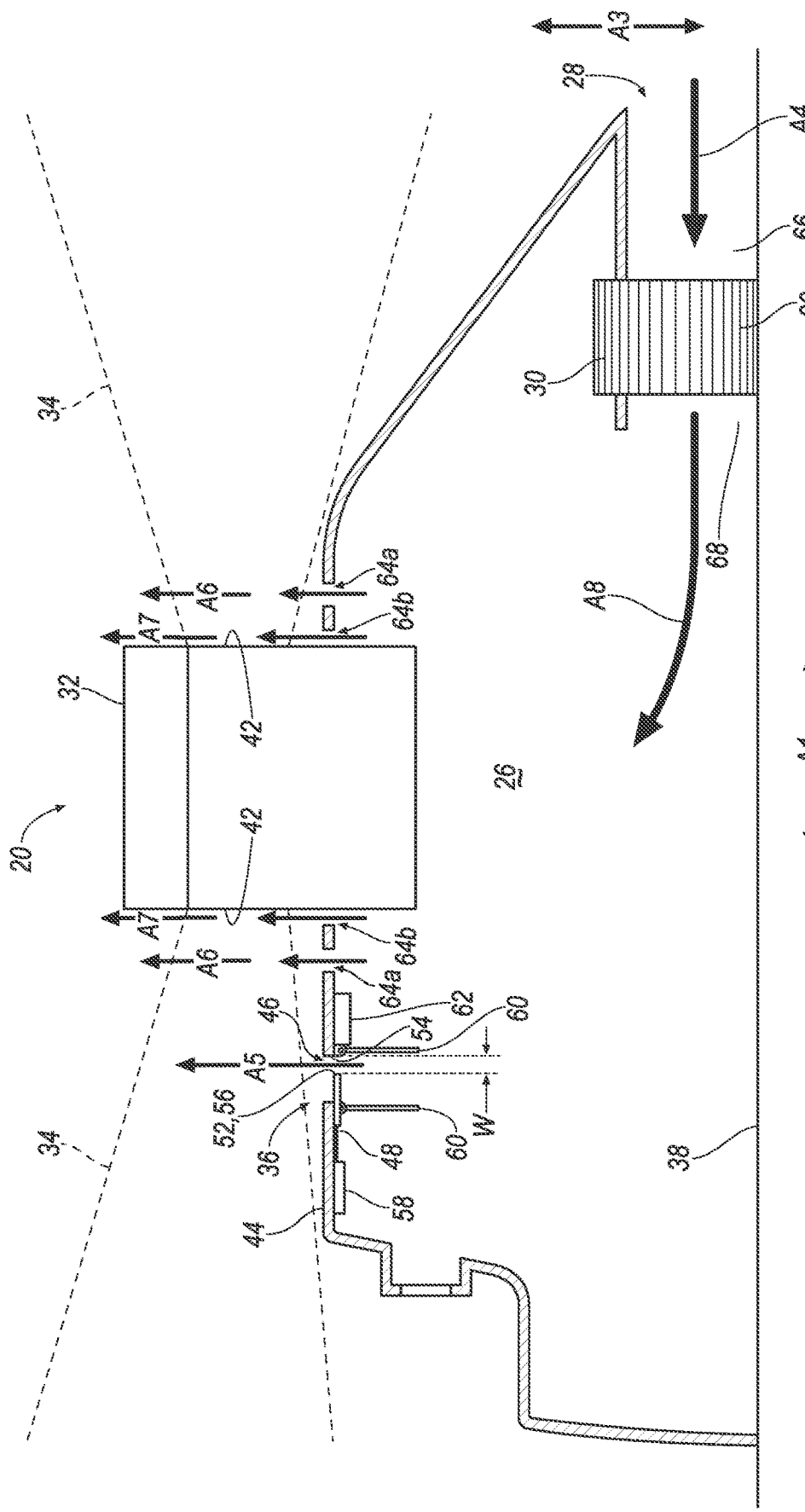
FIG. 3 is another cross section of components of the vehicle and the assembly taken at the line 2-2 of FIG. 1.
Figure 4:
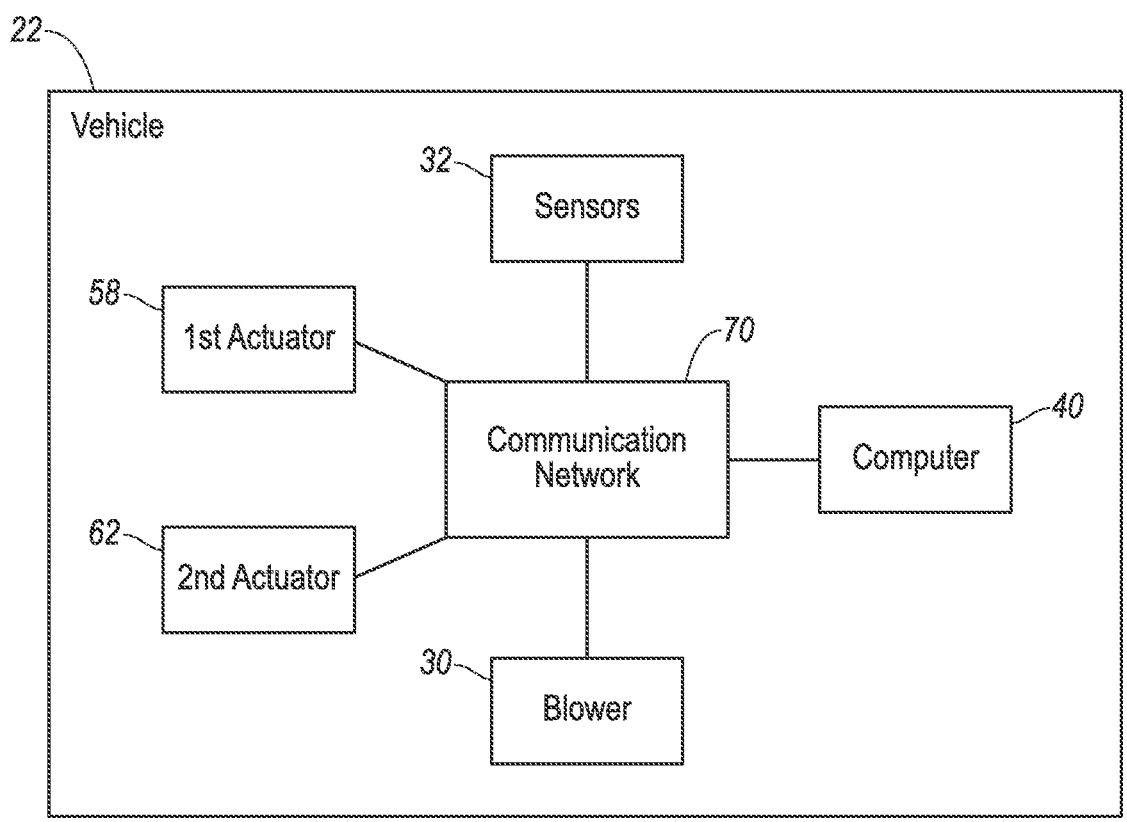
FIG. 4 is a block diagram of components of the vehicle and the assembly.

The housing 24 defines the chamber 26, illustrated in FIGS. 2 and 3. For example, the outer shell 44 of the housing 24 may define a top and sides of the chamber 26. The vehicle 22 may further define the chamber 26. For example, the roof 38 may define a bottom of the chamber 26.

The air inlet 28 of the housing 24 permits air A4 to enter the chamber 26. Before air A4 goes to blower, it may pass through an air filter to filter out debris, dust, snow, air etc. For example, the air inlet 28 may include an opening defined by outer shell 44 that extends from the chamber 26 to outside the housing 24.

The outlet vent 36 of the housing 24 permits air A5 to exit the chamber 26 and may maintain a clear field of view 34 of the sensor 32. For example, the outlet vent 36 may be aimed across the field of view 34 of the sensor 32, i.e., such that air A5 flowing of the outlet vent 36 travels across at least a portion of the field of view 34. Air A5 may deflect rain, snow, debris, dust etc., away from the lens 42, e.g., keeping the lens 46 clean for proper sensor vision and functioning.

The outlet vent 36 may be aimed to direct air A5 upward, i.e., such that air A5 from the outlet vent 36 generally flows from a bottom and towards a top of the field of view 34. For example, the outlet vent 36 may include an opening 46 defined by a top portion of the outer shell 44. The opening 46 may extend from the chamber 26 to outside the housing 24. The opening 46 may be further defined by a plate 48, as further described below.

The outlet vent 36 may be forward of the sensor 32. In other words, the outlet vent 36 may be between the front of the vehicle 22 and the sensor 32. For example, the opening 46 may be forward of the LIDAR sensor 32 extending upwardly from the housing 24. The outlet vent 36 could be at a leading edge of the housing 20 to deflect debris away from stereo cameras. The outlet vent 36 could be in between a pair of cameras at a top of the housing 24 to deflect debris away from top cameras.

The outlet vent 36 may be arcuate, e.g., along the longitudinal axis A1 and the cross-vehicle axis A2 as illustrated in FIG. 1. For example, the outlet vent 36 may have a radius of curvature equal to a distance between the opening 46 and a center of the LIDAR sensor 32.

The outlet vent 36 may partially encircle the sensor 32. For example, the opening 46 may circumferentially extend outward and rearward from in front of the center of the sensor 32. The opening 46 may extend to opposing distal ends 50. Spacing between the distal ends 50 along the cross-vehicle axis A2 may be generally equal to a width of the lens 42 along the cross-vehicle axis A2, e.g., such that air A5 from the outlet vent 36 redirects debris approaching the lens 42 from in front of the sensor 32.

The outlet vent 36 is of variable size enabling control of an amount and/or a speed of air A5 exiting the chamber 26. For example, a cross-sectional area of the opening 46 may be variable. A larger size may permit more air A5 to flow at a lower speed compared to a smaller size. The outlet vent 36 may have a fixed length L, e.g., along the cross-vehicle axis A2, as illustrated in FIG. 1. The outlet vent 36 may have a variable width W, e.g., along the longitudinal axis A1, as illustrated in FIGS. 2 and 3. For example, spacing between the distal ends 50 of the opening 46 along the cross-vehicle axis A2 may be fixed and spacing between a front edge 52 and a rear edge 54 of the opening 46 may be variable along the vehicle 22 longitudinal axis A1.

The outlet vent 36 may include a plate 48 movable between a first position, shown in FIG. 2, and a second position, shown in FIG. 3. The plate 48 may be moveable along the longitudinal axis A1 between the first position and the second position. A rear edge 56 of the plate 48 may define the front edge 52 of the opening 46. The rear edge 56 of the plate 48 may be farther from the rear edge 54 of the opening 46 along the longitudinal axis A1 in the first position than in the second position. The plate 48 may be slidable relative to the housing 24, for example the plate 48 may slide along a track, channel, or the like of the outer shell 44. The plate 48 may be plastic, or any suitable material. The adjectives "first" and "second" are used throughout this document as identifiers and are not intended to signify importance or order.

Moving the plate 48 between the first position and the second position varies the size of the outlet vent 36, e.g., by varying the width W of the opening 46. In other words, the outlet vent 36 has a larger size when the plate 48 is in first position than in the second position. For example, a distance between the rear edge 56 of the plate 48 and the rear edge 54 of the opening 46 (defining a size of the opening 46 therebetween) may be greater when the plate 48 is in the first position than when the plate 48 is in the second position.

An actuator 58 may be operatively coupled to the plate 48 to move the plate 48 between the first position and the second position, e.g., in respond to a command from the computer 40. The actuator 58 may be a linear actuator, i.e., that changes length in response to a command from the computer 40. The actuator 58 may convert rotary motion of a motor into linear displacement via screws and/or gears, e.g., with leadscrews, screw jacks, ball screws, roller screws, etc. The actuator 58 may be a servo, e.g., including a motor, a gear reduction unit, and a position sensor. The actuator 58 may be a component of the outlet vent 36 and/or supported by the housing 24.

The outlet vent 36 may be pivotable relative to the housing 24, e.g., about the cross-vehicle axis A2. Pivoting the outlet vent 36 about the cross-vehicle axis A2 changes direction of air A5 flowing out of outlet vent 36, e.g., toward the front or the rear of the vehicle 22. For example, the air A5 flowing out of the outlet vent 36 is illustrated an being directed more rearward in FIG. 2 than in FIG. 3. For example, the outlet vent 36 may include baffles 60 that are pivotal about the cross-vehicle axis A2 and relative to the housing 24 between a first position, shown in FIG. 2, and a second position, shown in FIG. 3. The baffles 60 direct air A5 flowing out of the opening 46. The baffles 60 may be pivotally supported with a hinge or other suitable structure.

A second actuator 62 may be operatively coupled to the baffles 60 to move the baffles 60 between the first position and the second position, e.g., in respond to a command from the computer 40. The second actuator 62 may be a linear actuator, a servo, etc. The second actuator 62 may be a component of the outlet vent 36 and/or supported by the housing 24.

The housing 24 may have one or more second outlet vents 64a, 64b between the sensor 32 and the outlet vent 36. The second outlet vents 64a, 64b are aimed to direct air A6, A7 across the field of view 34 of the sensor 32 between the sensor 32 and the air from the outlet vent 36. One of the second outlet vents 64b may be aimed to direct air A7 across the lens 42. Air A7 from the second outlet vent 64b may clean the lens 42. For example, such air A7 may urge water and other debris on the lens 42 to travel across, and off, the lens 42. The second outlet vent 64 may encircle the field of view 34 of the sensor 32. For example, the second outlet vent 64 may completely surround a perimeter of the lens 42.

The blower 30 pumps air, e.g., by generating lower air pressure at an intake 66 of the blower 30 relative to higher air pressure at an exhaust 68 of the blower 30. The blower 30 may include a motor operatively coupled to a fan. The blower 30 may operate at variable speeds. Varying speeds of the blower 30 controls a difference in the air pressure between the intake 66 and the exhaust 68. For example, the motor may operate at various rotational speeds, e.g., in response to a command from the computer 40. The blower 30 is in the chamber 26. The blower 30 may be supported by the housing 24. For example, the blower 30 may be fixed to the housing 24 via fastener or other suitable structure.

The blower 30 is in fluid communication with the air inlet 28 such that air A4 may flow from the air inlet 28 to the blower 30. For example, the intake 66 of the blower 30 may be in fluid communication with the air inlet 28 via one or more passages, ducts, channels, portions of the chamber 26, etc.

The blower 30 is in fluid communication with the outlet vent 36 such that air A8 may flow from the blower 30 to the outlet vent 36. For example, the exhaust 68 of the blower 30 may be in fluid communication with the outlet vent 36 via one or more passages, ducts, channels, portions of the chamber 26, etc.

The blower 30 may be in fluid communication with the second outlet vents 64a, 64b such that air A8 may flow from the blower 30 to the second outlet vents 64a, 64b. For example, the exhaust 68 of the blower 30 may be in fluid communication with the second outlet vents 64a, 64b via one or more passages, ducts, channels, portions of the chamber 26, etc.

The vehicle 22 may include a communication network 70. The communication network 70 includes hardware, such as a communication bus, for facilitating communication among vehicle components, such as the blower 30, the sensors 32, the actuator 58, the second actuator 62, the computer 40, etc. The communication network 70 may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 40, implemented via circuits, chips, or other electronic components, is included in the vehicle 22 for carrying out various operations, including as described herein. The computer 40 is a computing device that generally includes a processor and a memory, the memory including one or more forms of computer-readable media and storing instructions executable by the processor for performing various operations, including as disclosed herein. The memory further generally stores remote data received via various communications mechanisms; e.g., the computer 40 is generally configured for communications on a controller area network (CAN) bus or the like, and/or for using other wired or wireless protocols, e.g., Bluetooth, etc. The computer 40 may also have a connection to an onboard diagnostics connector (OBD-II). Via the communication network 70, Ethernet, WiFi, CAN bus, Local Interconnect Network (LIN), and/or other wired or wireless mechanisms, the computer 40 may transmit messages to various devices in the vehicle 22 and/or receive messages from the various devices, e.g., the blower 30, the sensors 32, the computer 40, the actuators, 58, 62, etc. Although one computer 40 is shown in Figure for ease of illustration, it is to be understood that the computer 40 could include, and various operations described herein could be carried out by, one or more computing devices.

The computer 40 may be programmed to control air flow out of the outlet vent 36 and the second outlet vents 64a, 64b to maintain a clear field of view 34 and clean the lens 42. For example, the computer 40 may command the actuator 58 to move the plate 48 and control to size of the opening 46, the second actuator 62 to change the angle of the baffles 60 and control the direction of the air flow out of the outlet, and/or the motor of the blower 30 to a specified speed to control an amount of air provided to the outlet vent 36 and/or the second outlet vents 64a, 64b. The computer 40 may determine the commands to transmit to the actuator 58, the second actuator 62, and/or the motor based on a speed on the vehicle 22, a heading of the vehicle 22, and/or ambient continents, e.g., wind speed and direction, precipitation, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a housing defining a chamber and having an air inlet;
   a blower in the chamber and in fluid communication with the air inlet; and
   a sensor having a field of view and supported by the housing;
   the housing having a first outlet vent of variable size, the first outlet vent in communication with the blower and aimed across the field of view of the sensor, the first outlet vent forward of and spaced from the sensor along a first axis, the first outlet vent having a variable width along the first axis, and the first outlet vent having a fixed length along a second axis that is perpendicular to the first axis, and wherein the width of the first outlet vent can be varied along the first axis while the length of the first outlet vent along the second axis remains fixed.

2. The assembly of claim 1, wherein the first outlet vent includes a plate movable between a first position and a second position, the first outlet vent having a larger size when the plate is in the first position than in the second position.

3. The assembly of claim 1, wherein the first outlet vent is pivotable relative to the housing.

4. The assembly of claim 1, wherein the housing has a second outlet vent aimed to direct air across the field the field of view of the sensor between the sensor and air elected from the first outlet vent.

5. The assembly of claim 4, wherein the first outlet vent partially encircles the sensor and the second outlet vent encircles the field of view of the sensor.

6. The assembly of claim 1, wherein the housing has a second outlet vent between the sensor and the first outlet vent.

7. The assembly of claim 1, further comprising a lens in the field of view of the sensor, the housing having a second outlet vent aimed to direct air across the lens.

8. The assembly of claim 1, wherein the first outlet vent is arcuate.

9. The assembly of claim 1, wherein the sensor is a LIDAR sensor and extends from the housing.

10. A vehicle, comprising:
a roof;
a housing supported by the roof, the housing defining a chamber and having an air inlet;
a blower in the chamber and in fluid communication with the air inlet;
a sensor supported by the housing and having a field of view; and
the housing having a first outlet vent with a fixed length along a cross-vehicle axis of the vehicle and a variable width along a vehicle-longitudinal axis of the vehicle, the outlet vent in communication with the blower and aimed across the field of view of the sensor, and wherein the width of the first outlet vent can be varied along the vehicle-longitudinal axis while the length of the first outlet vent along the cross-vehicle axis remains fixed.

11. The vehicle of claim 10, wherein the first outlet vent is forward of the sensor along the vehicle-longitudinal axis of the vehicle.

12. The vehicle of claim 10, further comprising a lens in the field of view of the sensor, the housing having a second outlet vent aimed to direct air across the lens.

13. The vehicle of claim 10, wherein the first outlet vent is aimed to direct air upward.

14. The vehicle of claim 10, wherein the sensor is a LIDAR sensor and extends upward from the housing.

15. The vehicle of claim 10, wherein the first outlet vent includes a plate movable between a first position and a second position, the outlet vent having a larger size when the plate is in the first position than in the second position.

16. The vehicle of claim 15, wherein the plate is movable along the vehicle-longitudinal axis.

17. The vehicle of claim 10, wherein the first outlet vent is pivotable about the cross-vehicle axis.

18. The vehicle of claim 10, wherein the housing has a second outlet vent aimed to direct air across the field of view of the sensor between the sensor and air elected from the first outlet vent, and wherein the first outlet vent partially encircles the sensor and the second outlet vent encircles the field of view of the sensor.

19. An assembly, comprising:
a housing defining a chamber and having an air inlet;
a blower in the chamber and in fluid communication with the air inlet; and
a sensor having a field of view and supported by the housing;
the housing having a first outlet vent of variable size;
the housing having a second outlet vent aimed to direct air across the field of view of the sensor between the sensor and air elected from the first outlet vent;
the first outlet vent is in communication with the blower and aimed across the field of view of the sensor; and
the first outlet vent partially encircles the sensor and the second outlet vent encircles the field of view of the sensor.

* * * * *

UNITED STATES PATENT AND TRADEMARK OFFICE
CERTIFICATE OF CORRECTION

| | | |
|---|---|---|
| PATENT NO. | : 11,525,894 B2 | Page 1 of 1 |
| APPLICATION NO. | : 16/521961 | |
| DATED | : December 13, 2022 | |
| INVENTOR(S) | : Sunil Reddy Patil et al. | |

It is certified that error appears in the above-identified patent and that said Letters Patent is hereby corrected as shown below:

In the Claims

| | |
|---|---|
| Column 7, Line 2, Claim 4 | delete "the field" (first occurrence); |
| Column 7, Line 3, Claim 4 | replace "elected" with --ejected--; |
| Column 8, Line 18, Claim 18 | replace "elected" with --ejected--; and |
| Column 8, Line 31, Claim 19 | replace "elected" with --ejected--. |

Signed and Sealed this
Fourteenth Day of February, 2023

*Katherine Kelly Vidal*

Katherine Kelly Vidal
*Director of the United States Patent and Trademark Office*